United States Patent [19]
Bronson

[11] Patent Number: 5,138,304
[45] Date of Patent: Aug. 11, 1992

[54] PROJECTED IMAGE LIGHT PEN

[75] Inventor: Barry Bronson, Saratoga, Calif.

[73] Assignee: Hewlett-Packard Company, Palo Alto, Calif.

[21] Appl. No.: 561,834

[22] Filed: Aug. 2, 1990

[51] Int. Cl.⁵ .................................. G09G 3/02
[52] U.S. Cl. ........................ 340/707; 340/709; 358/93
[58] Field of Search ........... 340/705, 706, 707, 708, 340/709; 178/18, 19; 358/22, 183, 231

[56] References Cited

U.S. PATENT DOCUMENTS

| | | | |
|---|---|---|---|
| 3,534,359 | 10/1970 | Harris | 340/709 |
| 3,885,096 | 5/1975 | Inuiya | 340/709 |
| 4,280,135 | 7/1981 | Schlossberg | 358/93 |
| 4,371,893 | 2/1983 | Rabeisen | 340/708 |
| 4,413,314 | 11/1983 | Slater et al. | 360/712 |

FOREIGN PATENT DOCUMENTS

| | | | |
|---|---|---|---|
| 0166639 | 10/1982 | Japan | 340/707 |
| 0230228 | 11/1985 | Japan | 340/707 |

*Primary Examiner*—Alvin E. Oberley
*Assistant Examiner*—Jick Chin

[57] ABSTRACT

A technique for interaction with a projected video image with a light pen and/or target marks on the projection screen in which light reflected from the projected image is compared with the video image to detect the position of a spot positioned on the projected image by the light pen and/or the reflection of the target marks. The computer used to generate the video image is then caused to position a cursor in the video image in response to the spot position and/or otherwise modify the generated and/or projected video image.

14 Claims, 1 Drawing Sheet

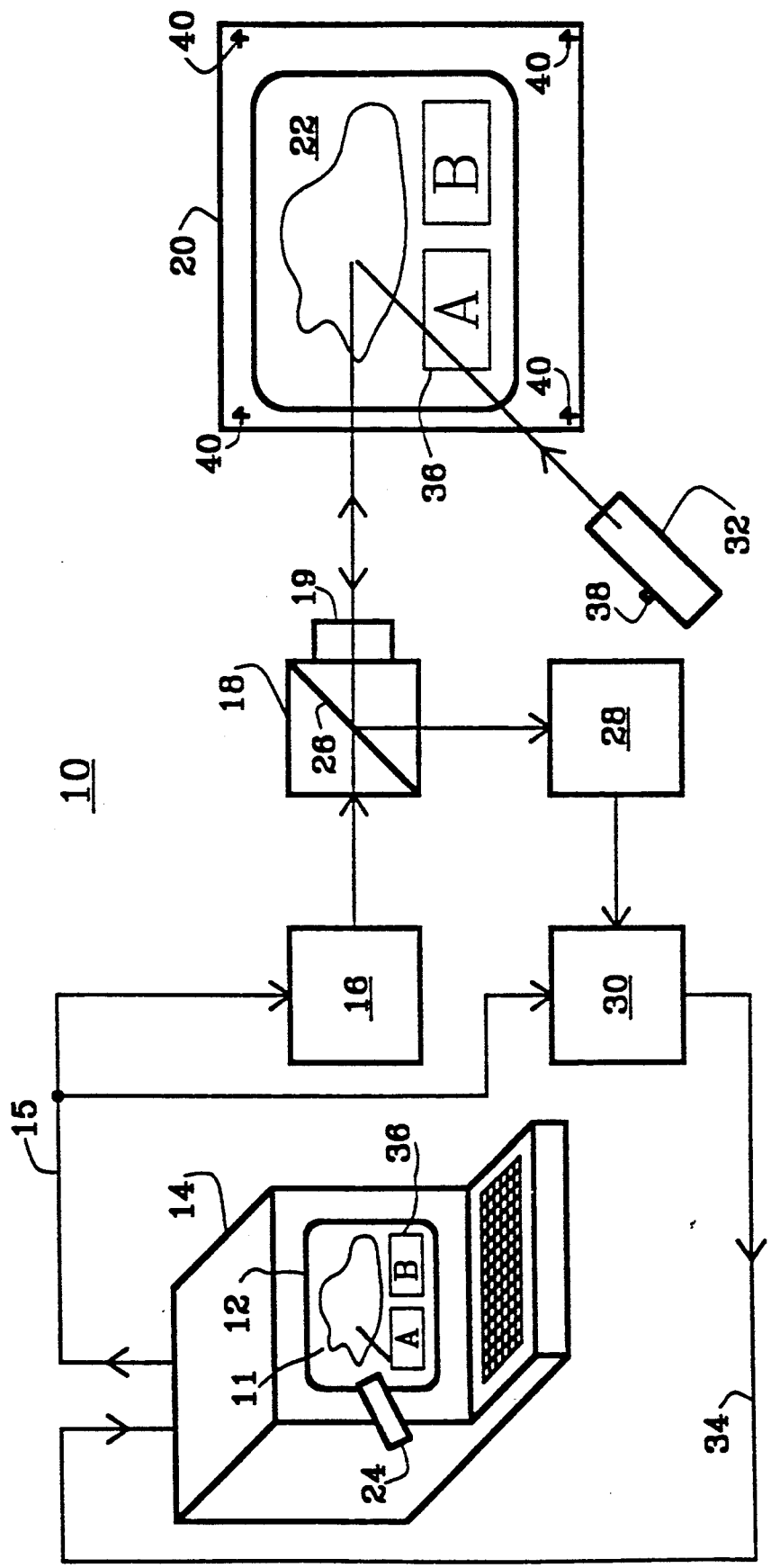

PROJECTED IMAGE LIGHT PEN

BACKGROUND OF THE INVENTION

1. Field of the Invention

This invention relates to projected video display systems as well as interactive video cursor position indicators, such as light pen systems.

2. Description of the Prior Art

Video display systems, such as the video monitors associated with conventional microcomputers, utilize video cursors (or other position designators) to indicate a designated location on the video display. Typical video cursors are blinking underlines or boxes used with text displays, or arrowheads used with graphic displays. The cursor is moved by the computer user to designate the display locations to be affected by application software. A common application is a video cursor used with word processing software to indicate the location on the display for the next letter to be typed. The user moves the cursor to select the next location.

Desired cursor motion is controlled by user actuation or movement of manual devices such as the computer keyboard, a mouse or trackball. Light pens are used to indicate desired location of cursors by interaction with the video display. That is, the light pen is positioned against the display to detect changes in the light pattern of the display where the pen is positioned. The pen is connected to the computer or other device which creates the display. The computer determines where the light pen is positioned by comparing the timing of the light detected and the light displayed. The computer may then change the video display by regenerating the cursor in the position indicated by the light pen.

Light pens have proven to be useful tools for interaction with video displays, but are limited to applications involving a small number of users at a time because the pen detector must be positioned against the display screen for interaction and the limited size of the monitors. As larger video monitors become available, more users can interact with the same monitor and light pen system at the same time. However, interaction is still limited to the relatively small number of users that can crowd around the video display.

Projected image video displays are becoming available for use by larger groups of users. In a meeting of six to ten users, for example, it would be inconvenient to directly use a typical video monitor as a visual display aid for the meeting. The same display, however, may be projected enlarged on a projection screen and viewed conveniently by the group.

Video display projectors are available in which the information provided to the normal video display is provided in parallel to a special purpose device which recreates an enlarged image by projection on a projection screen.

Projected video display systems are limited in that interaction with the video display must be accomplished directly with the original video display. That is, in a group meeting viewing a projected video display, one group member typically interacts with the original video display while other group members view, but are unable to directly interact with, the projected display. This reduces some of the benefits, particularly the spontaneity, of such video displays.

SUMMARY OF THE INVENTION

The preceding and other shortcomings of the prior art are addressed and overcome by the present invention that provides a system for interaction with a projected video image, having means for generating a video image, means for projecting an enlarged version of the video image, and image comparison means for causing the video image generating means to respond to differences between the video image and the projected image.

In another aspect, the invention a light pen for generating a spot on the projected image, and the image comparison means compares the combination of the projected image and the spot to the video image.

In still another aspect, the invention provides target marks on the projection screen and the image comparison means compares the combination of the projected image and the targets to the video image to modify the video image and/or the projected video image.

In a further aspect, the invention provides a method of interacting with a projected video image by generating a video image, projecting an enlarged version of the video image, and modifying the video image generated in response to differences between the video image and the projected image.

In another aspect, the invention provides a method in which a spot is generated on the projected image, and the combination of the projected image and the spot is compared to the video image.

In a still further aspect, the invention provides a method in which the image is projected on a projection screen including target marks, and the combination of the projected image and the target mark reflections are compared to the video image to modify the video image and/or the projected video image.

These and other features and advantages of this invention will become further apparent from the detailed description that follows which is accompanied by a set of drawing figures. In the figures and description, numerals indicate the various features of the invention; like numerals referring to like features throughout both the drawings and the description.

BRIEF DESCRIPTION OF THE DRAWINGS

The Figure is a generalized block diagram of a system according to the present invention providing light pen interaction with a projected image video display.

DETAILED DESCRIPTION OF THE PREFERRED EMBODIMENT(S)

The Figure is a generalized block diagram of projected image system 10 according to the present invention. In a conventional projected image video display system, video image 11 is displayed on monitor 12 of microcomputer 14, for convenience. Video bus 15 contains the information used to create video image 11 and is also connected to video projection converter 16 to create enlarged projected video image 22 by projection through optic assembly 18 and lens assembly 19 onto projection screen 20.

In a conventional, non-projected image light pen system, the user positions light pen 24 directly against monitor 12 for interaction with video image 11. Projected image system 10 combines the benefits of both conventional systems described above, the light pen system interacting directly with video image 11 and the projected video display system providing projected video image 22 on projection screen 20.

In accordance with the present invention, video image 11 is displayed on monitor 12 and projected on screen 20 as video image 22 by video projection converter 16 and optics assembly 18. Optics assembly 18, however, includes beam splitter subsystem 26 so that light reflected from projection screen 20 may be redirected to video display sensor array 28.

Video display sensor array 28 may be an array of photosensitive detectors sufficiently sensitive to detect individual pixels of light from video image 22.

In any event, the light reflected from projected video image 22 is detected by video display sensor array 28 and processed by comparator 30, in parallel with an equivalent image of video image 11 provided by video bus 15 from microcomputer 14. Under steady state conditions when the reflected light image detected by video display sensor array 28 is identical to projected video image 22, the output of comparator 30 provided to microcomputer 14 would indicate that no cursor position change information was detected.

In accordance with the present invention, however, any convenient source of projected light such as projected image light pen 32 may be operated by a user to project a spot on projected video image 22. The spot may be projected in visible light or, preferably, as infra red or other light not normally visible to the human eye. The spot will cause a change in the reflected light directed by beam splitter subsystem 26 to video display sensor array 28. Comparator 30 then detects the change and provides instructions to microcomputer 14 via cursor regeneration bus 34. Microcomputer 14 then can position the cursor within video image 11 so that when projected as video image 22, the cursor is regenerated to match the spot position.

In this manner, operation of projected image light pen 32 on projected video image 22 is fed back through beam splitter subsystem 26, video display sensor array 28, comparator 30 and cursor regeneration bus 34 to microcomputer 14 so that it operates in a manner similar to that of light pen 24 on video image 11 on microcomputer 14. Operations which could be performed by light pen 24 on microcomputer 14 may then be duplicated by projected image light pen 32 on projection screen 20.

For example, a lecturer in front of a group too large to conveniently directly view monitor 12, could use projection screen 20 to display information and still interact with microcomputer 14 via projected image light pen 32. The lecturer might wish to select choice A from menu 36, shown in video image 11 and therefore in projected video image 22.

Instead of diverting attention from his presentation to interact with microcomputer 14 directly, or request another person to do so for him, the lecturer could use projected image light pen 32 as an aid during his lecture to point out parts of projected video image 22 and also to select choice A at the appropriate time.

A particularly advantageous aspect of the ability to use projected image light pen 32 on projection screen 20 to interact with microcomputer 14 is that other members of the group could be provided with identical, or even electronically distinguishable, versions of projected image light pen 32. This approach would be convenient, for example, during a meeting which involved a review or revision of the information on projected video image 22. The lecturer and other members of the group could easily work together annotating or changing the information while discussing the changes. The authorship of the changes may detected by video display sensor array 28 and recorded by microcomputer 14.

Different light pens could be made distinguishable by color, intensity, blink modulation or any other means detectable by video display sensor array 28. Individual projected image light pens 32 could include multiple types of light beams and a switch for selectively switching between such types of light beams. For example, a type of light beam to which the image comparison is not responsive such as a visible light beam might be used for pointing at projected video image 22 without interaction with microcomputer 14. Actuation of button 38 on projected image light pen 32 at the user's discretion could cause another spot to be created, perhaps in infra red light, which would be detected by video display sensor array 28 and cause the desired interaction with microcomputer 14. Microcomputer 14 could then regenerate a cursor of noticeably different size, shape or color from the visible light spot projected by projected image light pen 32. Additional buttons 38 could provide access on projected image light pen 32 to other display functions, such as zoom-in, zoom-out, pan, rotate, drag etc.

In addition to interaction with projected image light pen 32, video display sensor array 28 could also be used to control video projection converter 16 and/or lens assembly 19 to maintain focus, color balance, distortion or other parameters of the display on projection screen 20. Suitable targets, such as non-reflecting marks 40 on projection screen 20 are illuminated by light from projected video image 22 and detected by video display sensor array 28. Any variation, for example, between the expected positions of marks 40 as stored or determined in microcomputer 14 and their positions as detected by video display sensor array 28 could be used to identify and therefore modify or control such parameters.

This ability of projected image system 10 to compare projected video image 22 with video image 11 as it would be displayed on monitor 12 would permit a convenient auto-setup system. For example, projected video image 22 could include peripheral target marks 40, similar to the target marks permanently fastened to projection screen 20. During comparison of video image 18 and video image 22 the focus, zoom, keystone distortion and/or field sizing of the projected image could be automatically corrected by adjusting projected video image 22 via microcomputer 14, optic assembly 18 and lens assembly 19 so that the projected target marks exactly covered permanent target marks 40 on projection screen 20.

While this invention has been described with reference to its presently preferred embodiment(s), its scope is not limited thereto. Rather, such scope is only limited insofar as defined by the following set of claims and all equivalents thereof.

What is claimed is:

1. A system for providing interaction with a projected video image, comprising:
   means for generating a video image;
   means for projecting an enlarged version of the video image;
   a light pen for generating a spot on the projected image; and image comparison means for causing the video image generating means to respond to differences between the video image and the projected image;

wherein the image comparison means compares the combination of the projected image and the spot to the video image.

2. The system of claim 1, wherein the image comparison means, further comprises:

means for repositioning a position designator in the video image in accordance with the spot position on the projected video image.

3. The system of claim 2 wherein the image comparison means further comprises:

optical means for capturing light reflected from the projected image;

detection means responsive to the optical means for detecting the reflected light;

comparator means for comparing the detected light and the video image to determine light pen spot location; and means responsive to the comparator means for providing the video image generating means with spot position information.

4. The system of claim 3 wherein the optical means further comprises:

a beam splitter for directing the projected video image while directing the reflected light to the comparator means.

5. A system for providing interaction with a projected video image, comprising:

means for generating a video image;

means for projecting an enlarged version of the video image;

a projection screen on which the enlarged version of the video image is projected;

target marks on the projection screen; and image comparison means for causing the video image generating means to respond to differences between the video image and the projected image;

wherein the image comparison means compares the combination of the projected image and the targets to the video image.

6. The system of claim 5 wherein the video image generating means generates a modified video image in response to the image comparison means.

7. The system of claim 6 wherein the video image projecting means projects a modified video image in response to the image comparison means.

8. A method of providing interaction with a projected video image, comprising the steps of:

generating a video image;

projecting an enlarged version of the video image;

generating a spot on the projected image;

comparing the combination of the projected image and the spot to the video image; and modifying the video image generated in response to differences between the video image and the projected image.

9. The method of claim 8 wherein the step of modifying the video image further comprises:

repositioning a position designator in the video image in accordance with the spot position on the projected image.

10. The method of claim 9 wherein the image comparison step further comprises:

detecting the light reflected from the projected image; and comparing the detected light and the video image to determine light pen spot location.

11. The method of claim 10 wherein the step of detecting the reflected light includes the step of:

projecting the video image through a beam splitter while directing the reflected light from the projected video image for comparison.

12. The method of claim 8 further comprising the steps of:

projecting the projected video image on a projection screen including target marks; and comparing the combination of the projected image and the target mark reflections to the video image.

13. The method of claim 12 wherein a modified video image is generated in response to the image comparison.

14. The method of claim 13 wherein a modified video image is projected in response to the image comparison.

* * * * *